US008788516B1

(12) United States Patent
Jakubik

(10) Patent No.: US 8,788,516 B1
(45) Date of Patent: Jul. 22, 2014

(54) GENERATING AND USING SOCIAL BRAINS WITH COMPLIMENTARY SEMANTIC BRAINS AND INDEXES

(71) Applicant: Paul A. Jakubik, Plano, TX (US)

(72) Inventor: Paul A. Jakubik, Plano, TX (US)

(73) Assignee: PureDiscovery Corporation, Dallas, TX (US)

( * ) Notice: Subject to any disclaimer, the term of this patent is extended or adjusted under 35 U.S.C. 154(b) by 0 days.

(21) Appl. No.: 13/842,144

(22) Filed: Mar. 15, 2013

(51) Int. Cl.
*G06F 17/30* (2006.01)
*G06F 7/00* (2006.01)

(52) U.S. Cl.
USPC ............... 707/758; 707/769; 706/20; 706/23

(58) Field of Classification Search
None
See application file for complete search history.

(56) References Cited

U.S. PATENT DOCUMENTS

| 4,839,853 | A | | 6/1989 | Deerwester et al. | |
|---|---|---|---|---|---|
| 6,029,195 | A | * | 2/2000 | Herz | 725/116 |
| 7,152,065 | B2 | * | 12/2006 | Behrens et al. | 1/1 |
| 2006/0112146 | A1 | * | 5/2006 | Song et al. | 707/200 |
| 2006/0173663 | A1 | * | 8/2006 | Langheier et al. | 703/11 |
| 2010/0049770 | A1 | * | 2/2010 | Ismalon | 707/765 |
| 2010/0331146 | A1 | * | 12/2010 | Kil | 482/8 |
| 2011/0313781 | A1 | * | 12/2011 | Ho | 705/1.1 |
| 2012/0254333 | A1 | * | 10/2012 | Chandramouli et al. | 709/206 |

OTHER PUBLICATIONS

On, Byung-Won, et al., "Comparative Study of Name Disambiguation Problem using a Scalable Blocking-based Framework," JCDL '05, Jun. 7-11, 2005, Denver, CO, USA, Copyright 2005 ACM 1-58113-876-8/05/0006, 10 pages.
Huang, Jian, et al., "Efficient Name Disambiguation for Large-Scale Databases," PKDD 2006, J. Fürnkranz, T. Scheffer, and M. Spiliopoulou (Eds): LNAI 4213, pp. 536-544, 2006, Springer-Verlag Berlin Heidelberg 2006.
Paul A. Jakubik, "Generating and Using Social Brains," U.S. Appl. No. 13/841,971, 50 pages, Mar. 15, 2013.

* cited by examiner

*Primary Examiner* — Angelica Ruiz
(74) *Attorney, Agent, or Firm* — Baker Botts L.L.P

(57) ABSTRACT

A method includes determining a plurality of social interactions associated with a plurality of people, generating a social object matrix using the determined social interactions, and generating a social brain by performing Singular Value Decomposition (SVD) on the social object matrix. The method further includes determining text from the social objects of the determined social interactions, generating a term-document matrix (TDM) using the determined text, generating a semantic brain by performing SVD on the TDM, generating an index using the determined text, and performing a query using the social brain, the semantic brain, and the index. The social brain is a singular value representation of the social object matrix and the semantic brain is a singular value representation of the TDM. Each social interaction is a particular person interacting with a particular social object.

20 Claims, 9 Drawing Sheets

| INTERACTION | PERSON | SOCIAL OBJECT |
|---|---|---|
| INTERACTION 120a | PERSON 101a | SOCIAL OBJECT 110a |
| INTERACTION 120b | PERSON 101a | SOCIAL OBJECT 110a |
| INTERACTION 120c | PERSON 101a | SOCIAL OBJECT 110b |
| INTERACTION 120d | PERSON 101b | SOCIAL OBJECT 110a |
| INTERACTION 120e | PERSON 101b | SOCIAL OBJECT 110a |
| INTERACTION 120f | PERSON 101c | SOCIAL OBJECT 110b |
| INTERACTION 120g | PERSON 101c | SOCIAL OBJECT 110b |
| INTERACTION 120h | PERSON 101c | SOCIAL OBJECT 110c |

*FIG. 3a*

| PERSON | INTERACTION | SOCIAL OBJECT |
|---|---|---|
| PERSON 101a | INTERACTION 120a | SOCIAL OBJECT 110a |
| PERSON 101a | INTERACTION 120b | SOCIAL OBJECT 110a |
| PERSON 101a | INTERACTION 120c | SOCIAL OBJECT 110b |
| PERSON 101b | INTERACTION 120d | SOCIAL OBJECT 110a |
| PERSON 101b | INTERACTION 120e | SOCIAL OBJECT 110a |
| PERSON 101c | INTERACTION 120f | SOCIAL OBJECT 110b |
| PERSON 101c | INTERACTION 120g | SOCIAL OBJECT 110b |
| PERSON 101c | INTERACTION 120h | SOCIAL OBJECT 110c |

*FIG. 3b*

| SOCIAL OBJECT | INTERACTION | PERSON |
|---|---|---|
| SOCIAL OBJECT 110a | INTERACTION 120a | PERSON 101a |
| SOCIAL OBJECT 110a | INTERACTION 120b | PERSON 101a |
| SOCIAL OBJECT 110a | INTERACTION 120d | PERSON 101b |
| SOCIAL OBJECT 110a | INTERACTION 120e | PERSON 101b |
| SOCIAL OBJECT 110b | INTERACTION 120c | PERSON 101a |
| SOCIAL OBJECT 110b | INTERACTION 120f | PERSON 101c |
| SOCIAL OBJECT 110b | INTERACTION 120g | PERSON 101c |
| SOCIAL OBJECT 110c | INTERACTION 120h | PERSON 101c |

|  | SOCIAL OBJECT 110a | SOCIAL OBJECT 110b | SOCIAL OBJECT 110c |
| --- | --- | --- | --- |
| PERSON 101a | 2 | 1 | 0 |

420b

|  | SOCIAL OBJECT 110a | SOCIAL OBJECT 110b | SOCIAL OBJECT 110c |
| --- | --- | --- | --- |
| PERSON 101b | 2 | 0 | 0 |

420c

|  | SOCIAL OBJECT 110a | SOCIAL OBJECT 110b | SOCIAL OBJECT 110c |
| --- | --- | --- | --- |
| PERSON 101c | 0 | 2 | 1 |

410

|  | SOCIAL OBJECT 110a | SOCIAL OBJECT 110b | SOCIAL OBJECT 110c |
| --- | --- | --- | --- |
| PERSON 101a | 2 | 1 | 0 |
| PERSON 101b | 2 | 0 | 0 |
| PERSON 101c | 0 | 2 | 1 |

SOCIAL OBJECT MATRIX

|  | PERSON 101a | PERSON 101b | PERSON 101c |
|---|---|---|---|
| SOCIAL OBJECT 110a | 2 | 2 | 0 |

520b

|  | PERSON 101a | PERSON 101b | PERSON 101c |
|---|---|---|---|
| SOCIAL OBJECT 110b | 1 | 0 | 2 |

520c

|  | PERSON 101a | PERSON 101b | PERSON 101c |
|---|---|---|---|
| SOCIAL OBJECT 110c | 0 | 0 | 1 |

510

|  | PERSON 101a | PERSON 101b | PERSON 101c |
|---|---|---|---|
| SOCIAL OBJECT 110a | 2 | 2 | 0 |
| SOCIAL OBJECT 110b | 1 | 0 | 2 |
| SOCIAL OBJECT 110c | 0 | 0 | 1 |

SOCIAL OBJECT MATRIX

GENERATING AND USING SOCIAL BRAINS WITH COMPLIMENTARY SEMANTIC BRAINS AND INDEXES

TECHNICAL FIELD

This disclosure relates in general to searching of data and more particularly to generating and using social brains with complimentary semantic brains and indexes.

BACKGROUND

People interact with various data objects in every day life. As one example, a person may create or edit a document. The document may be accessible through the Internet or an internal network such as a corporate local area network. As another example, a person may post a comment to a webpage, a photo, a video, or any other content on the Internet. Typically, interactions by people with data objects are not utilized when performing data queries.

SUMMARY OF THE DISCLOSURE

According to one embodiment, a method includes determining a plurality of social interactions associated with a plurality of people, generating a social object matrix using the determined social interactions, and generating a social brain by performing Singular Value Decomposition (SVD) on the social object matrix. The method further includes determining text from the social objects of the determined social interactions, generating a term-document matrix (TDM) using the determined text, generating a semantic brain by performing SVD on the TDM, generating an index using the determined text, and performing a query using the social brain, the semantic brain, and the index. The social brain is a singular value representation of the social object matrix and the semantic brain is a singular value representation of the TDM. Each social interaction is a particular person interacting with a particular social object.

Technical advantages of certain embodiments may include using a singular value representation of a social object matrix in order to connect a person to another person based on what the person knows instead of who the person knows. Some embodiments may provide methods of performing queries to locate people with similar interests to a particular person. Other technical advantages will be readily apparent to one skilled in the art from the following figures, descriptions, and claims.

Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 3a illustrates a database storing the social interactions of FIG. 2, according to certain embodiments;

FIGS. 3b and 3c illustrate groupings of the social interactions of FIG. 2, according to certain embodiments;

FIGS. 4 and 5 illustrate vectors and social object matrices generated from the social interactions of FIG. 2, according to certain embodiments;

DETAILED DESCRIPTION OF THE DISCLOSURE

In every-day life, a person may routinely interact with one or more data objects. As one example, a person may visit a webpage on the Internet and post a comment about a picture, a video, a blog posting, a product, or any other data object accessible online. As another example, a person may post a message via TWITTER (i.e., a "tweet") or re-tweet the tweet of another person. As yet another example, a person may create or edit a document that is accessible on the Internet or the local area network of the person's employer.

The teachings of the disclosure recognize that interactions with data objects may provide valuable information about people. For example, interactions by two different people with the same data object may indicate that the people share similar interests. Furthermore, interactions by people with certain data objects may be utilized to discover other data objects of interest. The following describes systems and methods of generating and using social brains for providing these and other desired features associated with social interactions.

Figure 1:
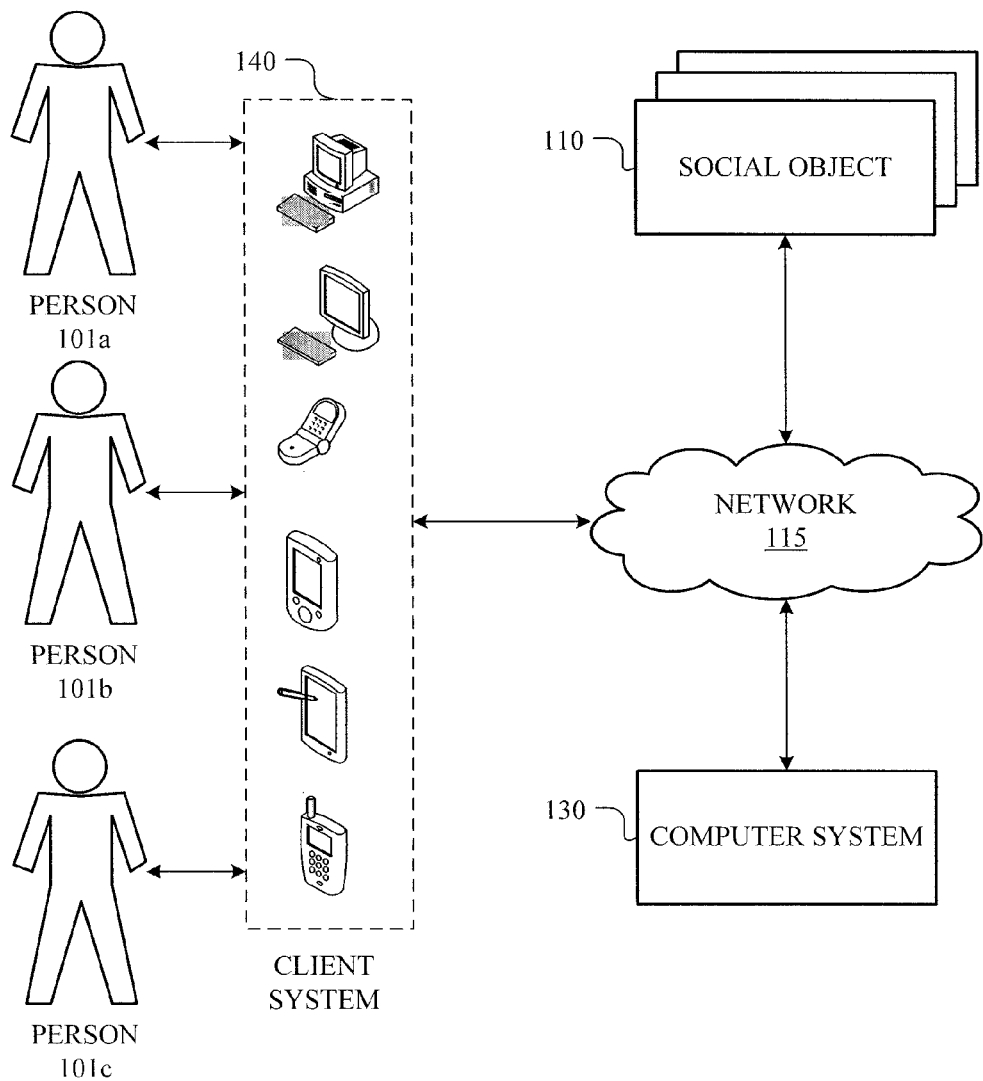
FIG. 1 illustrates a system for generating and using social brains, according to certain embodiments.

FIG. 1 illustrates a system 100 for generating and using social brains, according to certain embodiments. System 100 includes people 101 (i.e., person 101a-101c), social objects 110, a network 115, a computer system 130, and client systems 140. People 101 utilize client systems 140 to interact with one or more social objects 110 via network 115. Network 115 communicatively couples social objects 110, client systems 140, and computer system 130.

In general, people 101 interact with social objects 110 using client systems 140 and network 115. An interaction by person 101 may include any action by person 101 with social object 110 that may be recorded. As one example, person 101a utilizes a particular client system 140 such as a smartphone to post a comment on a social object 110 such as a webpage. As another example, person 101b utilizes a particular client system 140 such as a personal computer to edit a social object 110 such as a document. Computing system 130 determines the interactions by people 101 with social objects 110 and utilizes the interactions to build a social object matrix such as matrices 410 and 510 described below. In some embodiments, the social object matrix may be person-by-social object matrix or a social object-by-person matrix. Computer system 130 then utilizes the generated social object matrix to build a social brain, which is a reduced singular-value representation of the social object matrix. Once the social brain is built, it may be utilized by computer system 130 to discover social objects 110 that are socially similar or to discover people 101 with similar interests.

Social object 110 may be any data object that can be uniquely identified and that uniquely identifiable people 101 can interact with. In some embodiments, a data object may not be considered a social object 110 until at least two different people 101 have interacted with the data object. Social objects 110 may be textual or non-textual. Examples of textual social objects 110 include, but are not limited to, documents, emails, web pages, books, libraries, posts, tweets, articles, and the like. Examples of non-textual social objects 110 include, but are not limited to, images, videos, music, podcasts, databases, or any other data object that is accessible via network 115.

Network 115 may refer to any interconnecting system capable of transmitting audio, video, signals, data, messages, or any combination of the preceding. Network 115 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet, or any other suitable communication link, including combinations thereof. One or more portions of one or more of these networks may be wired or wireless. Example wireless networks 115 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

Computer system 130 may be any suitable computing system in any suitable physical form. As example and not by way of limitation, computer system 130 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 130 may include one or more computer systems 130; be unitary or distributed; span multiple locations; span multiple machines; or reside in a cloud, which may include one or more cloud components in one or more networks. Where appropriate, one or more computer systems 130 may perform without substantial spatial or temporal limitation one or more steps of one or more methods described or illustrated herein. As an example and not by way of limitation, one or more computer systems 130 may perform in real time or in batch mode one or more steps of one or more methods described or illustrated herein. One or more computer systems 130 may perform at different times or at different locations one or more steps of one or more methods described or illustrated herein, where appropriate. A particular embodiment of computer system 130 is described in more detail below in reference to FIG. 7.

Client system 140 may be an electronic device including hardware, software, or embedded logic components or a combination of two or more such components and capable of carrying out the appropriate functionalities implemented or supported by client system 140. As an example and not by way of limitation, a client system 140 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 140. A client system 140 may enable person 101 to access network 115 and interact with social objects 110.

In particular embodiments, client system 140 may include a web browser, such as MICROSOFT INTERNET EXPLORER, GOOGLE CHROME, or MOZILLA FIREFOX, and may have one or more add-ons, plug-ins, or other extensions. A user of client system 140 may enter a Uniform Resource Locator (URL) or other address directing the web browser to a particular server, and the web browser may generate a Hyper Text Transfer Protocol (HTTP) request and communicate the HTTP request to server. The server may accept the HTTP request and communicate to client system 140 one or more Hyper Text Markup Language (HTML) files responsive to the HTTP request. Client system 140 may render a webpage based on the HTML files from the server for presentation to person 101. Person 101 may then interact with the webpage by, for example, posting a message in response to content rendered on the webpage.

Figure 2:
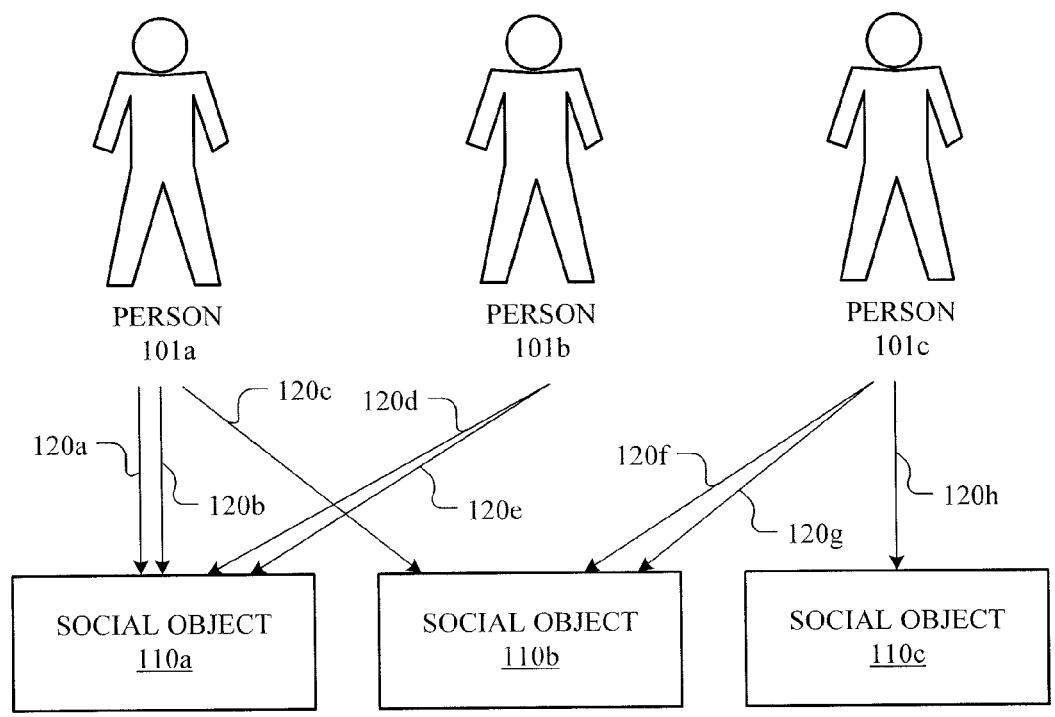
FIG. 2 illustrates an example of people interacting with the social objects of FIG. 1, according to certain embodiments.

FIG. 2 illustrates an example of people 101 interacting with social objects 110. In this example, three people—person 101a, 101b, and 101c—have social interactions 120a-120h with social objects 110a-110c. Specifically, FIG. 2 illustrates the following example interactions: person 101a has social interactions 120a and 120b with social object 110a and social interaction 120c with social object 110b; person 101b has social interactions 120d and 120e with social object 110a; and person 101c has social interactions 120f and 120g with social object 110b and social interaction 120h with social object 110c. While a specific number of people 101, social interactions 120, and social objects 110 are illustrated in FIG. 2, other embodiments may have any number of people 101, social interactions 120, and social objects 110.

In general, social interactions 120 are any instance of a uniquely identified person 101 interacting with a uniquely identified social object 110. Typically, social interactions are thought to be person-to-person interactions. However, embodiments of the disclosure define a social interaction as social interactions 120, which are person 101 to social object 110 interactions. Using social interactions 120 between person 101 and social object 110, embodiments may infer relationships between people 101. This allows embodiments to connect a person 101 to other people 101 based on what the person 101 knows, not who person 101 knows.

In some embodiments, social interactions 120 are captured as a triple including an identification of the social object 110, an identification of the person 101, and a timestamp capturing the date and time that social interaction 120 occurred. In some embodiments, more or less information about social interaction 120 may be captured and recorded. For example, social interactions 120 are captured in some embodiments as a tuple that includes a unique identification for a person 101 and a unique identification for a social object 110. As another example, social interactions 120 are captured in some embodiments as a triple that includes a unique identification for a person 101, a unique identification for a social object 110, and a unique identification for social interaction 120.

In some embodiments, computer system 130 may differentiate between social objects 110 that a person 101 frequently interacts with and social objects 110 that a person 101 rarely interacts with. To enable this, some embodiments capture social interactions 120 as a triple as described above (e.g., an identification of the social object 110, an identification of the person 101, and a timestamp capturing the date and time that social interaction 120 occurred, or a unique identification for a person 101, a unique identification for a social object 110, and a unique identification for social interaction 120). Computer system 130 may then utilized the captured information for social interactions 120 to count the number of interactions with a particular social object 110 by a particular person 101 and thus determine a frequency of interaction with the particular social object 110.

The unique identification for people 101, social objects 110, and social interactions 120 may be any appropriate identification and may depend on the domain and scope of a system. For example, if social objects are associated with TWITTER and it is desired to learn more about people who use TWITTER based on the URLs that they tweet, social interactions 120 may be captured as the following triple: twitter ID, URL, and tweet timestamp.

In some embodiments, various external representations or identifiers of people 101, social objects 110, and social interactions 120 are mapped to unique identifiers within computer system 130. For example, identifiers of people 101 may be converted to match a format of unique IDs within computer system 130. In some embodiments, people 101, social objects 101, and social interactions 120 may not be uniquely identifiable. In such embodiments, a disambiguation mapping process may be used by computer system 130 use to convert from an ambiguous person 101, social object 110, and social interaction 120 to a uniquely identified person 101, social object 110, and social interaction 120. Any appropriate disambiguation technique may be used such as the name disambiguation techniques described in the following papers:

> Huang, Jian, et al. "Efficient Name Disambiguation for Large-Scale Databases." Proceedings of the 10th European conference on Principle and Practice of Knowledge Discovery in Databases (2006): 536-544
>
> "Comparative Study of Name Disambiguation Problem using a Scalable Blocking-based Framework." Proceedings of the 5th ACM/IEEE-CS Joint Conference on Digital Libraries (2005): 344-353

In operation of example embodiments of FIGS. 1 and 2, computer system 130 builds social brains using social interactions 120 between people 101 and social objects 110. Social brains are tools for understanding people 101 and the social objects 110 that they interact with. At the core of social brains are social interactions 120, which is an instance of a uniquely identifiable person 101 interacting with a social object 110. As described above, a social object 110 is simply any uniquely identifiable data object that a person 101 can interact with.

To build a social brain, computer system 130 accesses data associated with social objects 110 and determines social interactions 120. As an example for illustrative purposes only, consider the example social interactions 120 of FIG. 2. In this example, computer system 130 accesses data associated with social objects 110a-110c and determines social interactions 120a-120h. As a specific example, if social object 110a is a webpage, computer system 130 may access the webpage and determine that person 101a and person 101b performed social interactions 120a-120e. Social interactions 120a-120e may have included, for example, people 101a and 101b posting a comment to the webpage.

In some embodiments, computer system 130 may record the determined social interactions 120a-120h in any appropriate format on any appropriate storage medium. As an example for illustrative purposes only, some embodiments of computer system 130 may record social interactions 120 in a database. FIG. 3a illustrates a database that includes the determined social interactions 120 of FIG. 2. While a specific format of storing social interactions 120 is illustrated in FIG. 3a, any appropriate format or schema may be used to record social interactions 120.

In some embodiments, computer system 130 may group the determined social interactions 120 into one or more groups. In some embodiments, computer system 130 may group determined social interactions 120 by people 101. For example, FIG. 3b illustrates a grouping of determined interactions 120a-120h by people 101a-101c. In some embodiments, computer system 130 may group determined social interactions 120 by social objects 110. For example, FIG. 3c illustrates a grouping of determined interactions 120a-120h by social objects 110a-110c.

In certain embodiments, computer system 130 processes the grouped social interactions 120 in order to create a social object matrix (e.g., matrices 410 and 510). For example, if interactions 120a-120h were grouped according to person 101, the following steps may be performed to create a person-by-social object matrix:

> Count the number of occurrences of each social object 110 for each person 101. Using the example of FIG. 3b, this would result in the following occurrence counts: person 101a=two occurrences of social object 110a and one occurrence of social object 110b; person 101b=two occurrences of social object 110a; and person 101a=two occurrences of social object 110b and one occurrence of social object 110c.
>
> Count the number of occurrences of each social object 110 across all people 101. Using the example of FIG. 3b, this would result in the following occurrence counts: social object 110a=four occurrences; social object 110b=three occurrences; and social object 110c=one occurrence.
>
> Filter social object 110 to determine which social objects 110 should be part of the vocabulary for describing people 101. In some embodiments, this may include ignoring social objects 110 if less than or equal to a certain number of people 101 have interacted with the social object 110. In certain embodiments, this may include ignoring social objects 110 if greater than or equal to a certain number of people 101 have interacted with the social object 110.
>
> Determine how each social object 110 should be globally weighted depending on the distribution of that social object 110 across all people 101.
>
> Create people vectors based on the counts of social objects 110 a person 101 has social interactions 120 with. In some embodiments, any local or global weighting scheme of those counts may be used to create the people vectors. For example, vectors 420a-420c of FIG. 4 illustrate
>
> people vectors created by computer system 130 for interactions 120a-120h of FIG. 2.
>
> Write the people vectors out as a single person 101 by social object 110 matrix. For example, FIG. 4 illustrates a person-by-social object matrix 410 created using vectors 420a-420c.

In some embodiments, one or more of the above steps may be omitted or one or more additional steps may be performed. Furthermore, certain embodiments may perform the above steps in any appropriate order. In some embodiments, computer system 130 may group interactions 120a-120h according to social object 110. In such embodiments, steps analogous to the above steps may be performed by computer system 130 to generate vectors 520a-520c and social object-by-person matrix 510 illustrated in FIG. 5.

After a person-by-social object matrix such as matrix 410 or a social object-by-person matrix such as matrix 510 is created, computer system 130 accesses the matrix and utilizes Singular Value Decomposition (SVD) to produce a reduced singular value representation of the matrix. SVD decomposes the input matrix into three decomposed matrices: a social object (SO) matrix 645a, an S matrix 645b, and a person matrix 645c. SO matrix 645a gives a mapping of each social object in interactions 120 into some higher dimensional space, S matrix 645b is a diagonal matrix that relates vectors within or across spaces, and person matrix 645*c* provides a mapping of each person into a similar higher dimensional space.

In some embodiments, matrices such as a person-by-social object matrix 410 and social object-by-person matrix 510 are too large to be efficiently processed by computer system 130. In such embodiments, various methods may be employed to calculate the SVD in an acceptable amount of time. In one embodiment, computer system 130 utilizes a sample of the vectors (e.g., vectors 420 and 520) that is small enough to be processed efficiently. The remaining vectors are the projected into the space created from the sampled vectors. In another embodiment, clustering techniques may be used to cluster the person-by-social object matrix 410 and social object-by-person matrix 510. The clustering techniques may include splitting the matrix into smaller matrices based on the clusters, recalculating the vocabulary statistics for each smaller matrix to produce a matrix with its own vocabulary, and using the new matrices to produce a library of SVD results. More details about specific clustering techniques which may used to cluster the person-by-social object matrix 410 and social object-by-person matrix 510 may be found in U.S. patent application Ser. No. 12/263,169 ("System and Method for Discovering Latent Relationships in Data") which is incorporated herein by reference.

The output of using SVD on person-by-social object matrix 410 or social object-by-person matrix 510 (e.g., SO matrix 645*a*, S matrix 645*b*, and person matrix 645*c*) is a reduced singular value representation of the vector space of a person-by-social object matrix 410 or social object-by-person matrix 510. This reduced singular value representation may be referred to as a social brain and a collection of social brains may be referred to as a social brain library.

In some embodiments, interactions 120 may be classified as either a positive or a negative interaction with social object 110. In general, whether an interaction 120 is positive or negative may be referred to as the sentiment of the interaction 120. In some embodiments, an interaction 120 may be determined to be a positive or negative interaction 120 based on an indication from person 101 about the interaction. For example, if person 101 indicates that he likes a particular social object 110, computer system 130 may classify the interaction 120 as a positive interaction. Conversely, if person 101 indicates that he dislikes a particular social object 110, computer system 130 may classify the interaction 120 as a negative interaction. In some embodiments, computer system 130 may perform any appropriate sentiment analysis on comments made by a person 101 about a social object 110. In general, any appropriate technique for determining whether a particular interaction 120 is positive or negative may be used.

In some embodiments, a sentiment analysis of interactions 120 may not provide a crisp Boolean like or dislike. For example, while person 101 could indicate a strict Boolean like or dislike of a social object 110, a sentiment analysis may be at best 80% certain, and many sentiment analysis techniques will include an estimate of their certainty. So a comment by person 101 might indicate a 10% chance that the person disliked a social object 110, and a 40% chance that the person liked the social object 110. In such cases, some embodiments may use fuzzy logic and simply record both percentages. So instead of counting 1 instance of liking a social object 110, or 1 instance of disliking a social object 110, some embodiments may simultaneously record 0.4 instances of liking the social object 110 and 0.1 instances of disliking the social object 110.

In some embodiments, the sentiment of interactions 120 may be used to shape social brains. As one example, a particular social brain may be built using only social interactions 120 that reflect a positive sentiment to represent a person 101. As another example, some embodiments may create separate positive sentiment and negative sentiment social brains for a person 101. In such embodiments, scores from both social brains may be used to determine the likelihood that the person 101 will have a positive or negative interaction with a social object 110 they have not seen before.

In some embodiments, social brains generated by computer system 130 may be used to perform specialized queries for a particular person 101. As one example, a generated social brain may be used to perform a "You might also like . . . " query. These queries use the social object space (e.g., SO 645*a* and singular values (e.g. S 645*b*) created while producing a social brain. This type of query would not be used to find social objects 110 that are topically similar. Instead, this type of query could be used to find social objects 101 that are socially similar. For example, this query could find social objects 110 that were liked by people 101 similar to the people 101 who like a particular document used to conduct the query. Specific examples of performing queries such as a "You might also like . . . " query are discussed below.

In some embodiments, a "You might also like . . . " query may be performed based on viewing a particular social object 110 ("X"), and X is already in the social brain. In this case, the following steps may be performed to determine social recommendations based on X:
 1. Look up the social object space vector Vx for X.
 2. Compare Vx to every other vector Vi in the social object space.
 3. Return the N closest social objects 110 where N is the desired number of social recommendations.

In some embodiments, a "You might also like . . . " query may be performed based on viewing a particular social object 110 ("X"), and X is not in the social brain. However, enough people in the social brain have interacted with X to make a judgment about it (enough people may be, for example, around 10 people). In this case, the following steps may be performed to determine social recommendations based on X:
 1. Calculate a people space vector Vx for X based on the people that have interacted with X and the number of times they have interacted with X.
 2. Project the people space vector into the social object space as Vpx (the vector projected into social object space).
 3. Compare Vpx to every other vector Vi in the social object space.
 4. Return the N closest social objects 110 where N is the desired number of social recommendations.

In some embodiments, a "You might also like . . . " query may be performed based on viewing a particular social object 110 ("X"), and X is not in the social brain and there have not been enough social interactions 120 with X by people in the social brain to learn about X. In this case, the following steps may be performed to determine social recommendations based on X:
 1. Use a multi-concept query to find documents most related to X that are in the social brain.
 2. Use an index relevance score for each related document as a weight for each related document.
 3. Use the weighted sum of the most related documents in the social brain to create a pseudo vector Vx representing X.
 4. Compare Vx to every other vector Vi in the social object space.
 5. Return the N closest social objects 110 where N is the desired number of social recommendations.

In some embodiments, a generated social brain may be used to perform a "You might want to talk to . . ." query. These queries may be performed using similar methods as those discussed above for the "You might also like . . ." queries, except the person object space (e.g., person 645c and singular values (e.g. S 645b) that created while producing a social brain is used instead of the social object space. This type of query could be used to find people with similar interests to the person used to conduct the query. For example, this query could find social objects 110 that were liked by people 101 similar to the people 101 who like a particular document used to conduct the query.

In certain embodiments, multiple social objects 110 or multiple people 101 may be used to query a vector space. In some embodiments, such queries may be performed by creating a single pseudo vector for the social objects 110 or people 101. In some embodiments, multi-concept querying may be used. More details about multi-concept querying may be found in U.S. patent application Ser. No. 13/326,284 ("Multi-Concept Latent Semantic Analysis Queries") which is incorporated herein by reference.

Figure 6:
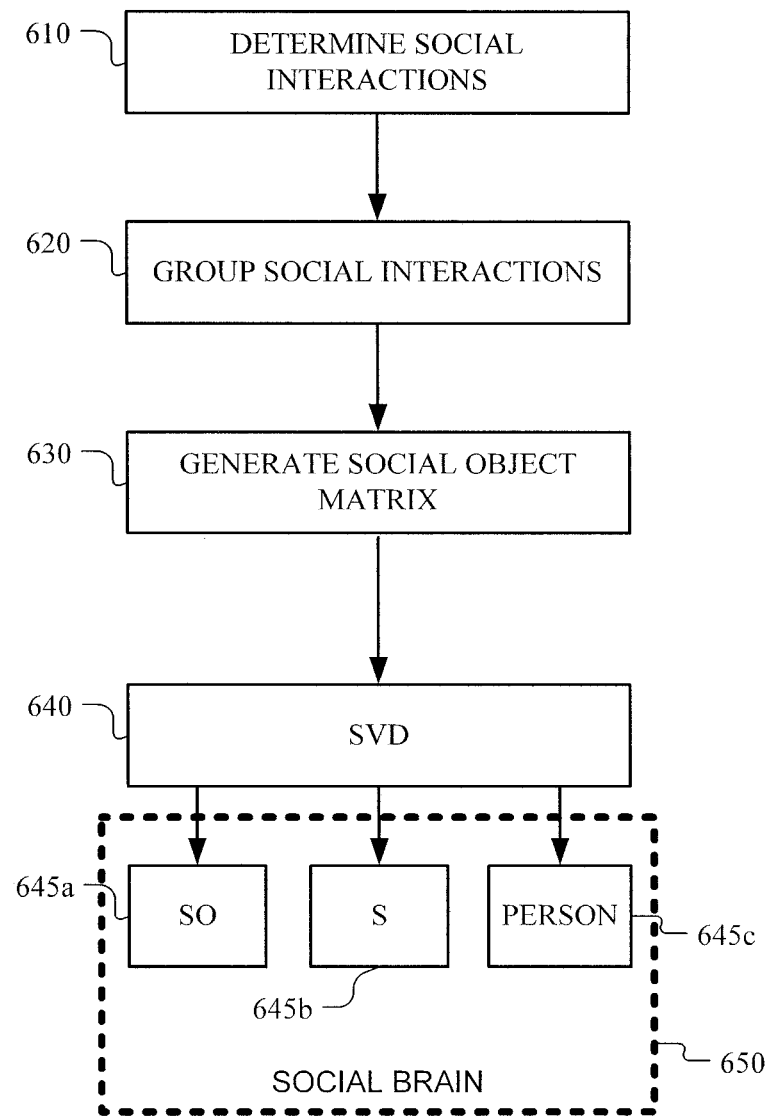
FIG. 6 illustrates a method for generating and using social brains, according to certain embodiments.

FIG. 6 illustrates an example method 600 for generating a social brain. Method 600 begins in step 610 where social interactions are determined. In some embodiments, the social interactions are social interactions 120 described above. In some embodiments, the social interactions are any instance of a uniquely identified person interacting with a uniquely identified social object such as social objects 110. In certain embodiments, the social interactions are determined by accessing social objects 110 via a network such as network 115.

In step 620, the social interactions determined in step 610 are grouped into one or more groups. In some embodiments, the social interactions are grouped according to person. In some embodiments, the social interactions are grouped according to social object.

In step 630, a social object matrix is generated. In some embodiments, the social object matrix is a person-by-social object matrix such as matrix 410 above. In some embodiments, the social object matrix is a social object-by-person matrix such as matrix 510 above.

In some embodiments, generating the social object matrix of step 630 includes determining a number of occurrences of each social object for each person, determining a number of occurrences of each social object across all of the people, and determining a subset of the social objects. Step 630 may further include determining a weighting for each social object of the subset of social objects, the weighting based at least in part on a distribution of the social objects across all of the people, and creating vectors based on the determined number of occurrences of each social object for each of the people and the determined weighting for each social object. The vectors created may include people vectors such as vectors 420a-420c or social object vectors such as social object vectors 520a-520c.

In some embodiments, step 630 may include determining a number of occurrences of each social object for each of the plurality of people, generating vectors based in part on the determined number of occurrences of each social object for each of the people, and clustering the vectors into clusters. The clusters may include a first and a second cluster, the first and second clusters each having two or more of the vectors. In some embodiments, step 630 may alternatively or additionally include sampling the vectors.

In step 640, SVD is utilized on the matrix generated in step 630 to produce a reduced singular value representation of the matrix (i.e., a social brain). The social brain may include a social object matrix such as SO matrix 645a, a diagonal matrix such as S matrix 645b that relates vectors within or across spaces, and a person matrix such as person matrix 645c. After step 640, method 600 ends.

Figure 7:
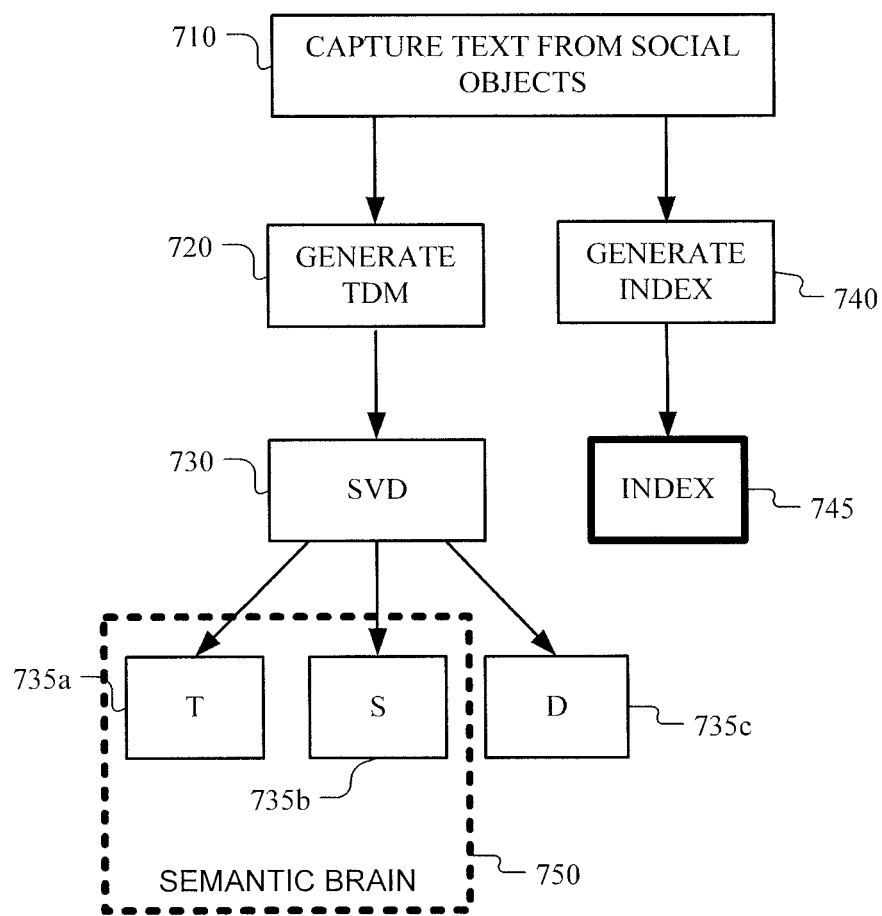
FIG. 7 illustrates a method for generating a complementary semantic brain and index for use with the social brain of FIG. 6, according to certain embodiments.

FIG. 7 illustrates a method 700 for generating a complementary semantic brain and index for use with the social brain of FIG. 6. Method 700 begins in step 710 where text is captured from social objects 110. In some embodiments, the text is captured from textual social objects 110. Examples of textual social objects may include documents, emails, web pages, books, libraries, posts, articles, and the like. The text for textual social objects 110 may be captures by, for example, accessing the social objects 110 via network 115 and storing data from the accessed social objects in any available format in any available storage medium. As one example, if a particular social object 110 is a document stored as a portable document format (PDF) file online, the text from the PDF file may be accessed and stored by computer system 130 as a PDF file or any other appropriate format. As another example, frequent tweeters of links on TWITTER may be identified and the tweets with links may be followed for the identified tweeters. Web pages identified in the tweets may then be downloaded, the text extracted from the web pages, and the extracted text stored in the index.

In some embodiments, step 710 includes capturing text from non-textual social objects 110. Example of non-textual social objects 110 may include pictures, movies, videos, music, podcasts, and the like. For non-textual social objects, step 710 may include determining a proxy for the non-textual object and then capturing text from the proxy. Examples of proxies for non-textual social objects may include transcripts, comments, descriptions of the non-textual social object, or any other textual data or metadata associated with or representing the non-textual social object. In some embodiments, the proxies may be generated using optical character recognition (OCR) technology, voice recognition technology, or any other automated technology for discovering text from non-textual data.

In step 720, the text captured in step 710 is analyzed and vectors representing the captured text are created. In one embodiment, for example, the vectors created from analyzing the captured text are term vectors. The term vectors contain terms found in a social object 110 such as a document and the number of occasions the term appears in the social object 110. The term vectors are then combined to create a term-document matrix ("TDM") which is a matrix having social objects 110 (e.g., documents) on one axis and the terms found in the social objects 110 on the other axis. At the intersection of each term and social object 110 in the TDM is the number of times the term appears in the social object 110. In some embodiments, the number of times each term appears in the social object 110 is multiplied by the term's weight. The term weights may be, for example, standard TFIDF term weights.

In step 730, method 700 utilizes SVD to decompose the TDM generated in step 720 into three decomposed matrices 735: a $T_O$ matrix 735(a), an $S_O$ matrix 735(b), and a Do matrix 735(c). If social objects 110 from step 710 are documents (i.e., textual social objects 110), $T_O$ matrix 735(a) gives a mapping of each term in the documents into some higher dimensional space, $S_O$ matrix 735(b) is a diagonal matrix that scales the term vectors in $T_O$ matrix 735(a), and Do matrix 735(c) provides a mapping of each document into a similar higher dimensional space. In some embodiments, only $T_O$ matrix 735(a) and $S_O$ matrix 735(b) are used to perform queries and may be referred to as a semantic brain 750.

In step 740, method 700 generates an index 745 from the text captured in step 710. In general, index 745 is any appropriate keyword index. In some embodiments, index 745 is a scalable realtime keyword index from ELASTICSEARCH or LUCENE. In some embodiments, index 745 is any index that supports searching for phrases, and permits OR queries with long lists of words and phrases. In some embodiments, index 745 permits weights to be added to words and phrases in the index.

In certain embodiments, semantic brain 750 is built from the text included in social objects 110 (either textual data object, or non-text objects with proxies). The text of social objects 110 is then stored in index 745. References to the original source of that text may also be stored in the index. This allows a way to locate an original social object 110 once text for a social object is found in the index.

In some embodiments, social brain 650, semantic 750, and index 745 may be utilized together in order to provide recommendations based on input queries. For example, social brain 650, semantic brain 750, and index 745 may be utilized to provide social recommendations for a particular document (e.g., people 101 who would be interested in the document). Method 800 below is one example of how queries can be performed using social brain 650, semantic 750, and index 745.

Figure 8:
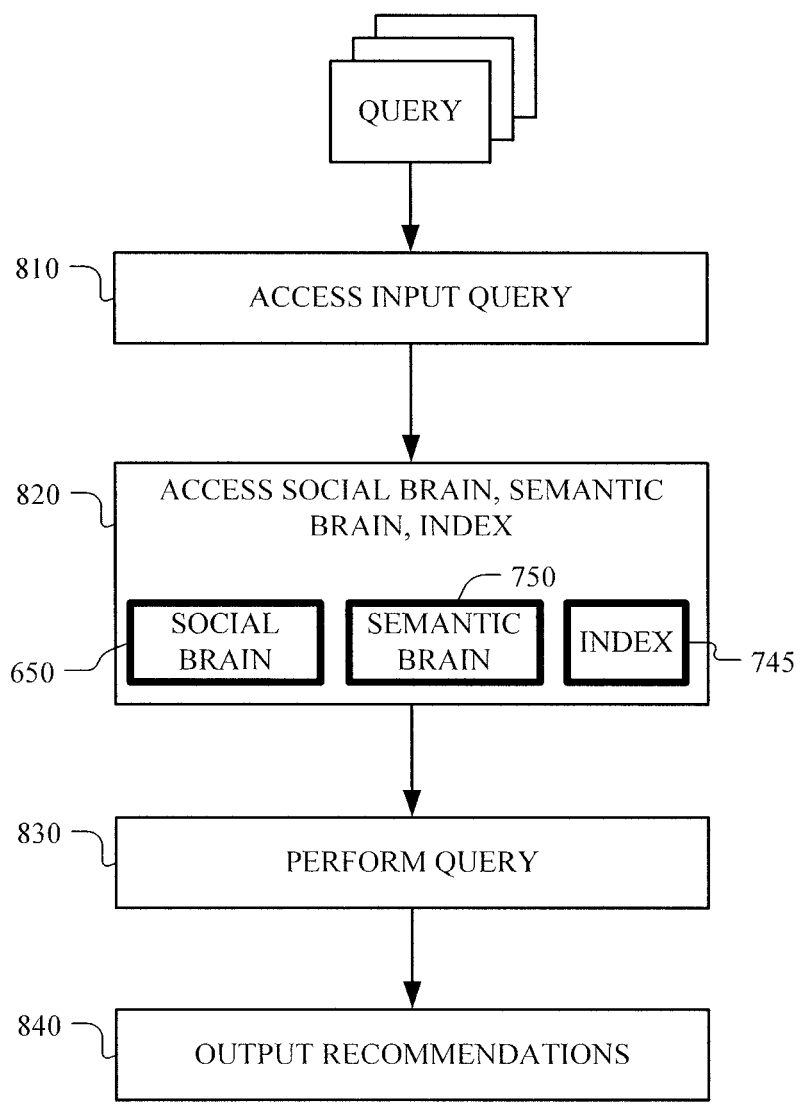
FIG. 8 illustrates a method for performing a query using social brain of FIG. 6 and semantic brain and index of FIG. 7, according to certain embodiments.

FIG. 8 illustrates a method 800 for performing a query using social brain 650 of FIG. 6 and semantic brain 750 and index 745 of FIG. 7. Method 800 begins in step 810 where an input query is accessed. In some embodiments, the input query may be one or more social objects 110 such as documents. In some embodiments, the input query may be one or more people 101.

In step 820, a social brain, semantic brain, and index are accessed. In some embodiments, the social brain, semantic brain, and index are social brain 650, semantic brain 750, and index 745 discussed in reference to FIGS. 6 and 7 above. In some embodiments, social brain 650, semantic brain 750, and index 745 are accessed from a storage medium such as memory 904 or storage device 906 described below.

In step 830, a query is performed using the social brain, semantic brain, and index accessed in step 820. For example, social recommendations for documents that are not in social brain 650 may be discovered. Various scenarios and algorithms for determining social recommendations are discussed further below.

At the time social brain 650 is generated, some embodiments may reject certain social objects 110 in which not much is known, and only build social brain 650 with social objects 110 that are known well enough to have sensible learning. This may be a function of meeting a minimum threshold for how many people have interacted with the social object 110, and that minimum threshold might be adjusted depending on the total volume of people and social interactions 120 that are available to learn from. Such filtering may mean that it is likely that social objects 110 for which social recommendations are desired are not in the brain. In addition, new social objects 110 are constantly being discovered. Unless new social objects 110 are instantaneous projected into the social brain (something that having a social brain, semantic brain, and an index enables), new social objects may not be in the social brain. An algorithm for getting social recommendations for a social object 110 that is not in the social brain is as follows:

1. Get the text associated with the social object 110 for which social recommendations are desired.
2. Use semantic brain 750 to perform a multi-concept query on the text and get terms and weights back.
3. Query index 175 using those terms and weights to find documents in the social brain 650.
4. Get the top results for this index query. In some embodiments, the top results may be the top N results, all results scoring more than a predetermined X, or get up to N results as long as the score is greater than X.
5. For each social object 110 in the result set, look up its vector in the social brain 650.
6. Combine the vectors from (5) using the query score for each from (4) to scale their influence, and create a pseudo document for the social object 110 for which social recommendations are desired.
7. Perform a standard brain query to get the top M social recommendations for the original social object 110 using the pseudo vector created in (6).

In some embodiments, a similar process to the above process (which creates a pseudo vector for a document that is not in the social brain) may be utilized to instantly project social objects 110 into the brain and make them discoverable. This may be accomplished using the following example process.

1. When a new social object that is not in the social brain 650 is discovered, use steps 1-6 from the above process to create a pseudo vector for it.
2. Add that pseudo vector to a list of pseudo vectors projected into the brain.
3. When a pseudo query is performed, in addition to querying social brain 650, query the list of projected pseudo vectors as well.
4. As a result, new social objects 110 that were not around when SVD process was used to create the social brain 650, or social objects 110 that were rejected from being members in social brain 650, may be given a place in the list of projected pseudo vectors for the brain.

In some embodiments, better results may be achieved by setting a floor of activity before a particular social object is allowed to be returned. This floor could be accomplished many ways, including the following example:

1. Boost the results of more popular social objects.
2. Keep track of how many users have interacted with a social object 110 and do not return that social object 110 from a brain query until at least N users have interacted with it.
3. Keep track of how many users have interacted with a social object 110 and do not project that social object 110 into the social brain 650 until at least N users have interacted with it.

After step 840, the social recommendations are output. For example, the social recommendations may be provided for display to person 101. After step 840, method 800 may end.

In some embodiments, computer system 130 synchronizes the contents of index 745, social brain 650, and semantic brain 750 in order to provide near real-time social recommendations. For example, as soon as a new social object 110 is discovered by computer system 130 (e.g., when a new document is saved or edited by person 101), computer system 130 adds the social object 110 to index 745, determines the proper place for the social object 110 in social brain 750, and determines if any changes need to be made to semantic brain 750 based on the contents of the social object 110. This may involve, for example, periodically doing a brain build with all documents that cross a social curation threshold.

In some embodiments, it may not be practical to instantly add a social object 110 such as a document instantly to both index 745 and social brain 650. For example, some embodiments of index 745 may contain at least ten times as many social objects 110 (e.g., documents) as social brain 650. In such embodiments, some embodiments may employ certain techniques in order to provide social recommendations for a particular social object 110 in a timely manner. For example, computer system 130 may first search index 745 for semantically related social objects 110 that are in social brain 650. This involves utilizing semantic brain 750 and index 745. Next, computer system 130 uses the top social objects 110 (e.g. documents) and degrees of relatedness to each social object 110 to create a pseudo-document in the social brain space. This involves utilizing social brain 650 and index 745 search results. Finally, computer system 130 uses the pseudo-document to get social recommendations. This involves using social brain 650.

Figure 9:
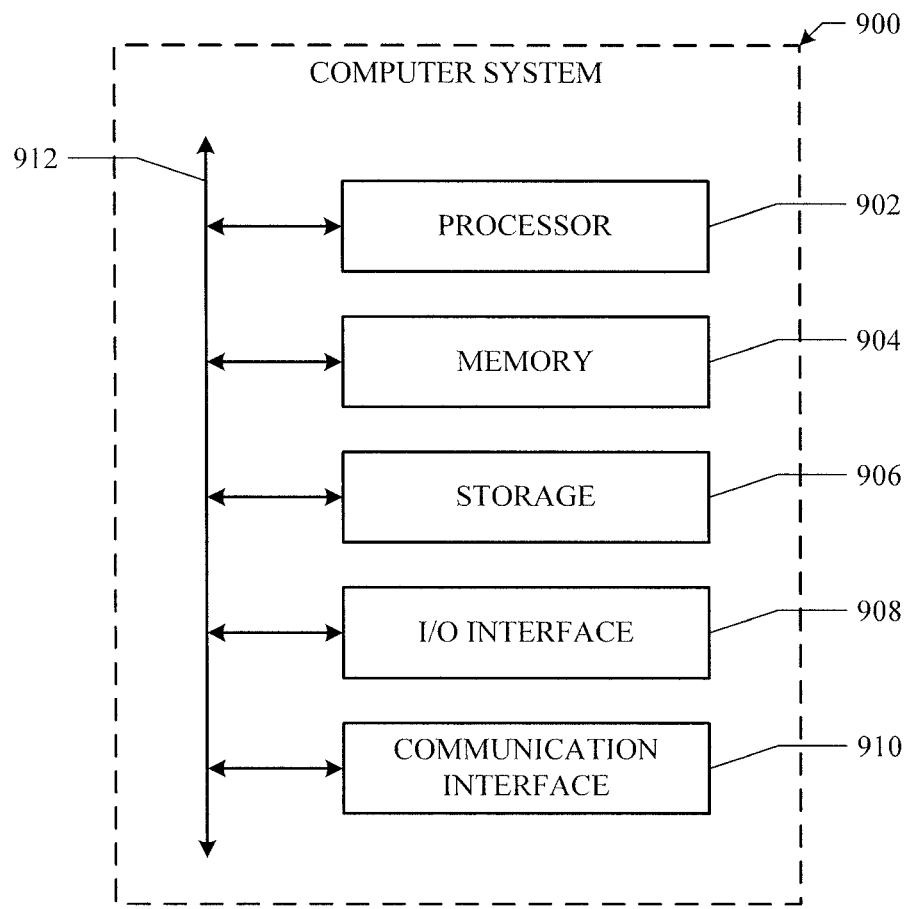
FIG. 9 is a computer system where particular embodiments of the disclosure may be implemented.

FIG. 9 illustrates an example computer system 900. Computer system 900 may be utilized by computer system 130 of FIG. 1. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

The components of computer system 900 may be integrated or separated. In some embodiments, components of computer system 900 may each be housed within a single chassis. The operations of computer system 900 may be performed by more, fewer, or other components. Additionally, operations of computer system 900 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
   one or more memory units; and
   one or more processors operable to:
   determine a plurality of social interactions associated with a plurality of people, each social interaction comprising a particular person interacting with a particular social object of a plurality of social objects;
   generate a social object matrix using the determined social interactions;
   generate a social brain by performing Singular Value Decomposition (SVD) on the social object matrix, the social brain comprising a singular value representation of the social object matrix;
   determine text from the social objects of the determined social interactions;
   generate a term-document matrix (TDM) using the determined text;
   generate a semantic brain by performing SVD on the TDM, the semantic brain comprising a singular value representation of the TDM;
   generate an index using the determined text; and
   perform a query using the social brain, the semantic brain, and the index.

2. The system of claim 1, wherein determining text from the social objects of the determined social interactions comprises:
   capturing text from the plurality of social objects that are textual social objects; and determining proxies for the plurality of social objects that are non-textual social objects and capturing text from the determined proxies.

3. The system of claim 1, wherein performing the query using the social brain, the semantic brain, and the index comprises:
   determining, using the semantic brain and the index, one or documents in the social brain that are semantically related to a query document;
   creating a pseudo-document using the determined one or more semantically related documents; and
   determining one or more social recommendations using the social brain and the created pseudo-document.

4. The system of claim 1, wherein the one or more processors are further operable to group the determined social interactions into the plurality of groups according to the plurality of people or the plurality of social objects.

5. The system of claim 1, wherein generating the social object matrix comprises:
   determining a number of occurrences of each social object for each of the plurality of people;
   determining a number of occurrences of each social object across all of the plurality of people;
   determining a subset of the plurality of social objects;
   determining a weighting for each social object of the subset of social objects, the weighting based at least in part on a distribution of the social objects across all of the plurality of people; and
   creating the plurality of vectors based on the determined number of occurrences of each social object for each of the plurality of people and the determined weighting for each social object.

6. The system of claim 1, wherein the social object matrix comprises a person-by-social object matrix.

7. The system of claim 1, wherein the social object matrix comprises a social object-by-person matrix.

8. A computer-implemented method, comprising:
   determining, by one or more computing systems, a plurality of social interactions associated with a plurality of people, each social interaction comprising a particular person interacting with a particular social object of a plurality of social objects;
   generating, by the one or more computing systems, a social object matrix using the determined social interactions;
   generating, by the one or more computing systems, a social brain by performing Singular Value Decomposition (SVD) on the social object matrix, the social brain comprising a singular value representation of the social object matrix;
   determining, by the one or more computing systems, text from the social objects of the determined social interactions;
   generating, by the one or more computing systems, a term-document matrix (TDM) using the determined text;
   generating, by the one or more computing systems, a semantic brain by performing SVD on the TDM, the semantic brain comprising a singular value representation of the TDM;
   generating, by the one or more computing systems, an index using the determined text; and
   performing, by the one or more computing systems, a query using the social brain, the semantic brain, and the index.

9. The computer-implemented method of claim 8, wherein determining text from the social objects of the determined social interactions comprises:
   capturing text from the plurality of social objects that are textual social objects; and
   determining proxies for the plurality of social objects that are non-textual social objects and capturing text from the determined proxies.

10. The computer-implemented method of claim 8, wherein performing the query using the social brain, the semantic brain, and the index comprises:
    determining, using the semantic brain and the index, one or documents in the social brain that are semantically related to a query document;
    creating a pseudo-document using the determined one or more semantically related documents; and
    determining one or more social recommendations using the social brain and the created pseudo-document.

11. The computer-implemented method of claim 8, further comprising grouping, by the one or more computing systems, the determined social interactions into the plurality of groups according to the plurality of people or the plurality of social objects.

12. The computer-implemented method of claim 8, wherein generating the social object matrix comprises:
    determining a number of occurrences of each social object for each of the plurality of people;

determining a number of occurrences of each social object across all of the plurality of people;

determining a subset of the plurality of social objects;

determining a weighting for each social object of the subset of social objects, the weighting based at least in part on a distribution of the social objects across all of the plurality of people; and creating the plurality of vectors based on the determined number of occurrences of each social object for each of the plurality of people and the determined weighting for each social object.

13. The computer-implemented method of claim 8, wherein the social object matrix comprises a person-by-social object matrix.

14. The computer-implemented method of claim 8, wherein the social object matrix comprises a social object-by-person matrix.

15. A non-transitory computer-readable medium comprising software, the software when executed by one or more processors operable to perform operations comprising:

determining a plurality of social interactions associated with a plurality of people, each social interaction comprising a particular person interacting with a particular social object of a plurality of social objects;

generating a social object matrix using the determined social interactions;

generating a social brain by performing Singular Value Decomposition (SVD) on the social object matrix, the social brain comprising a singular value representation of the social object matrix;

determining text from the social objects of the determined social interactions;

generating a term-document matrix (TDM) using the determined text;

generating a semantic brain by performing SVD on the TDM, the semantic brain comprising a singular value representation of the TDM;

generating an index using the determined text; and performing a query using the social brain, the semantic brain, and the index.

16. The non-transitory computer-readable medium of claim 15, wherein determining text from the social objects of the determined social interactions comprises:

capturing text from the plurality of social objects that are textual social objects; and determining proxies for the plurality of social objects that are non-textual social objects and capturing text from the determined proxies.

17. The non-transitory computer-readable medium of claim 15, wherein performing the query using the social brain, the semantic brain, and the index comprises:

determining, using the semantic brain and the index, one or documents in the social brain that are semantically related to a query document;

creating a pseudo-document using the determined one or more semantically related documents; and determining one or more social recommendations using the social brain and the created pseudo-document.

18. The non-transitory computer-readable medium of claim 15, the operations further comprising grouping the determined social interactions into the plurality of groups according to the plurality of people or the plurality of social objects.

19. The non-transitory computer-readable medium of claim 15, wherein generating the social object matrix comprises:

determining a number of occurrences of each social object for each of the plurality of people;

determining a number of occurrences of each social object across all of the plurality of people;

determining a subset of the plurality of social objects;

determining a weighting for each social object of the subset of social objects, the weighting based at least in part on a distribution of the social objects across all of the plurality of people; and creating the plurality of vectors based on the determined number of occurrences of each social object for each of the plurality of people and the determined weighting for each social object.

20. The non-transitory computer-readable medium of claim 15, wherein the social object matrix comprises a person-by-social object matrix or a social object-by-person matrix.

\* \* \* \* \*